(12) United States Patent
zur Loye et al.

(10) Patent No.: US 11,448,148 B2
(45) Date of Patent: Sep. 20, 2022

(54) METHOD AND SYSTEM FOR REDUCING A STARTUP TIME OF A GENSET

(71) Applicant: Cummins Inc., Columbus, IN (US)

(72) Inventors: Axel O. zur Loye, Columbus, IN (US); Mark A. Bargent, Kent (GB); Andrew G. Kitchen, Daventry (GB); Robin J. Bremmer, Columbus, IN (US); Philipe F. Saad, Columbus, IN (US); Milan K. Visaria, Pune (IN); Timothy P. Lutz, Zionsville, IN (US)

(73) Assignee: CUMMINS INC., Columbus, IN (US)

( * ) Notice: Subject to any disclaimer, the term of this patent is extended or adjusted under 35 U.S.C. 154(b) by 193 days.

(21) Appl. No.: 16/800,281

(22) Filed: Feb. 25, 2020

(65) Prior Publication Data

US 2020/0271066 A1    Aug. 27, 2020

Related U.S. Application Data

(60) Provisional application No. 62/912,126, filed on Oct. 8, 2019, provisional application No. 62/810,706, filed on Feb. 26, 2019.

(51) Int. Cl.

| *F02D 41/06* | (2006.01) |
|---|---|
| *F02N 5/04* | (2006.01) |
| *F02N 9/04* | (2006.01) |
| *F02N 11/08* | (2006.01) |
| *H02K 7/00* | (2006.01) |

(Continued)

(52) U.S. Cl.
CPC .............. *F02D 41/062* (2013.01); *F02N 5/04* (2013.01); *F02N 9/04* (2013.01); *F02N 11/0866* (2013.01);

(Continued)

(58) Field of Classification Search
CPC ............. F02D 41/062; F02D 2200/101; F02D 2200/50; F02D 41/064; F02D 29/06;

(Continued)

(56) References Cited

U.S. PATENT DOCUMENTS

| 2007/0029799 A1* | 2/2007 | Shimizu | .................. F02D 29/06 |
|---|---|---|---|
| | | | 713/323 |
| 2010/0019506 A1* | 1/2010 | Gong | .................... B60W 10/08 |
| | | | 290/1 A |

(Continued)

FOREIGN PATENT DOCUMENTS

GB          2507968 A      5/2014

OTHER PUBLICATIONS

International Search Report and Written Opinion for International patent application No. PCT/US2020/047417, filed Aug. 21, 2020, dated Jan. 26, 2021.

*Primary Examiner* — Sizo B Vilakazi

(74) *Attorney, Agent, or Firm* — Faegre, Drinker, Biddle & Reath LLP

(57) ABSTRACT

A method and system of power generating is provided to reduce a startup time of a genset for providing requested power to a utility grid or a load. The genset includes a generator, a turbocharger, and an energy storage. The generator includes an engine. The genset responds to a genset start signal by accelerating an engine speed of the generator to reach a synchronous speed. The engine speed is accelerated more rapidly by activating the energy storage device to supply power to at least one of the generator and the turbocharger. The generator then supplies power to the utility grid or load.

28 Claims, 12 Drawing Sheets

(51) Int. Cl.
*H02K 7/18* (2006.01)
*F03D 9/00* (2016.01)

(52) U.S. Cl.
CPC .......... *H02K 7/003* (2013.01); *H02K 7/1807* (2013.01); *F02D 2200/101* (2013.01); *F02D 2200/50* (2013.01); *F02N 2200/022* (2013.01); *F02N 2200/06* (2013.01); *F02N 2200/08* (2013.01); *F03D 9/00* (2013.01)

(58) Field of Classification Search
CPC .......... F02D 41/0007; F02N 5/04; F02N 9/04; F02N 11/0866; F02N 2200/022; F02N 2200/06; F02N 2200/08; F02N 19/00; F02N 2011/0885; H02K 7/003; H02K 7/1807; F03D 9/00; Y02T 10/12; F02B 37/10; F02B 39/10
See application file for complete search history.

(56) References Cited

U.S. PATENT DOCUMENTS

| | | | |
|---|---|---|---|
| 2010/0109344 A1* | 5/2010 | Conway | F02D 41/021 |
| | | | 290/40 A |
| 2010/0194203 A1 | 8/2010 | Patterson | |
| 2011/0259016 A1 | 10/2011 | Winston et al. | |
| 2012/0296506 A1* | 11/2012 | Kotani | H02J 7/1438 |
| | | | 701/22 |
| 2013/0018569 A1 | 1/2013 | Sangameswaran | |
| 2014/0026564 A1 | 1/2014 | Jacobson et al. | |
| 2015/0076820 A1 | 3/2015 | Pendray et al. | |
| 2015/0136531 A1 | 5/2015 | Rogers et al. | |
| 2015/0180281 A1 | 6/2015 | Al-Atat et al. | |
| 2018/0262139 A1 | 9/2018 | Oguguo et al. | |
| 2019/0299968 A1* | 10/2019 | Morita | B60W 10/08 |

* cited by examiner

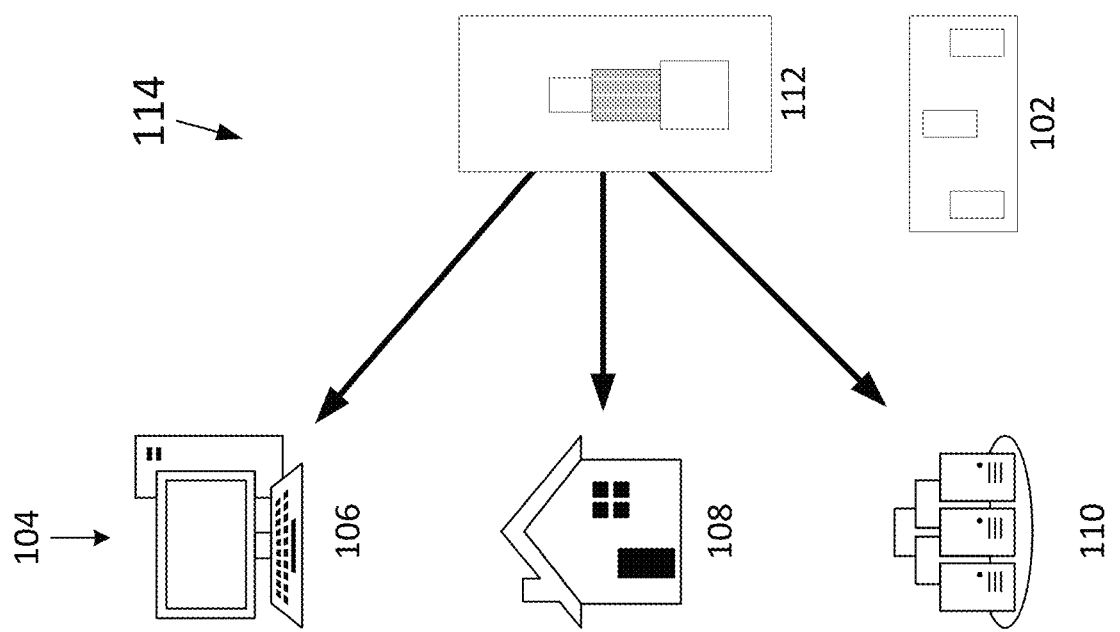
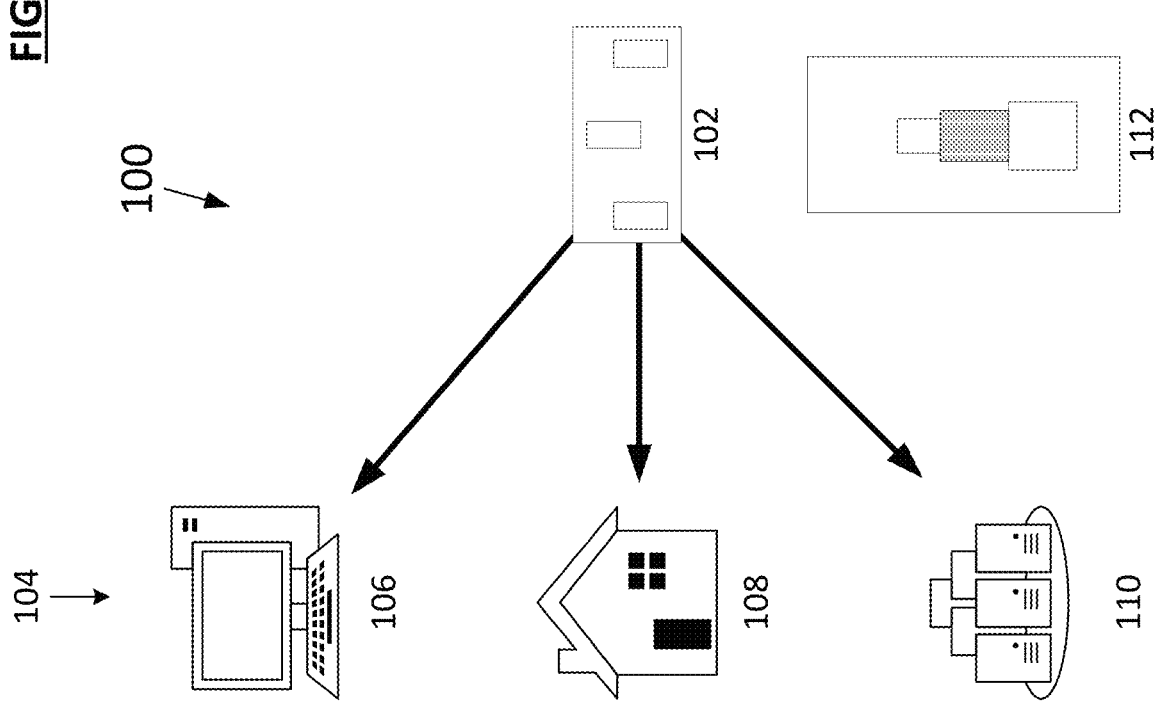
FIG. 1 (Prior Art)

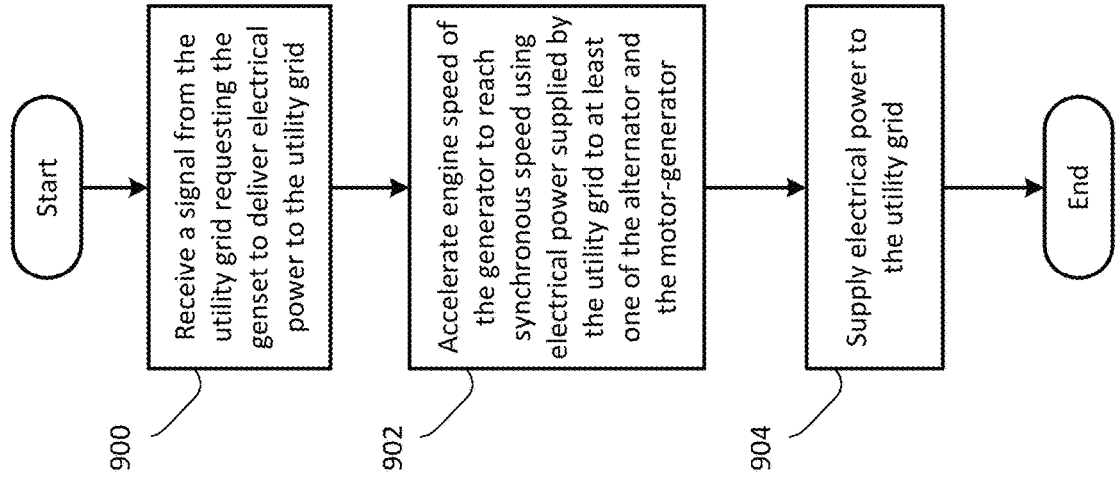
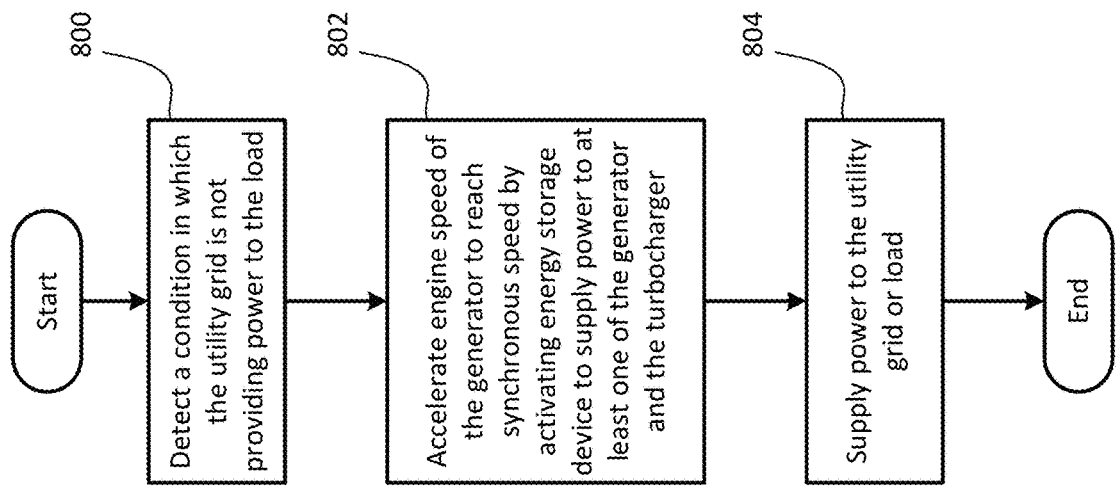

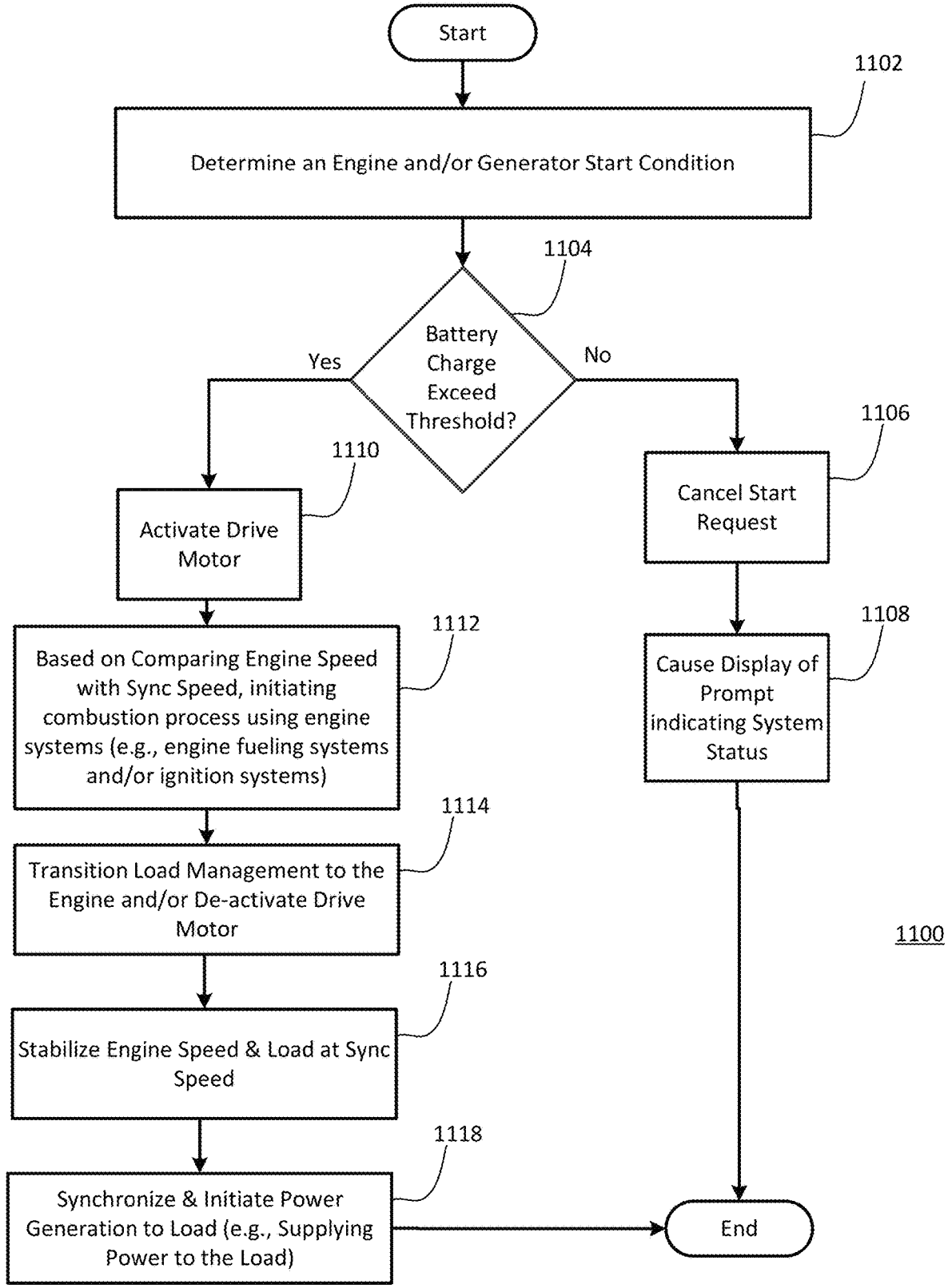

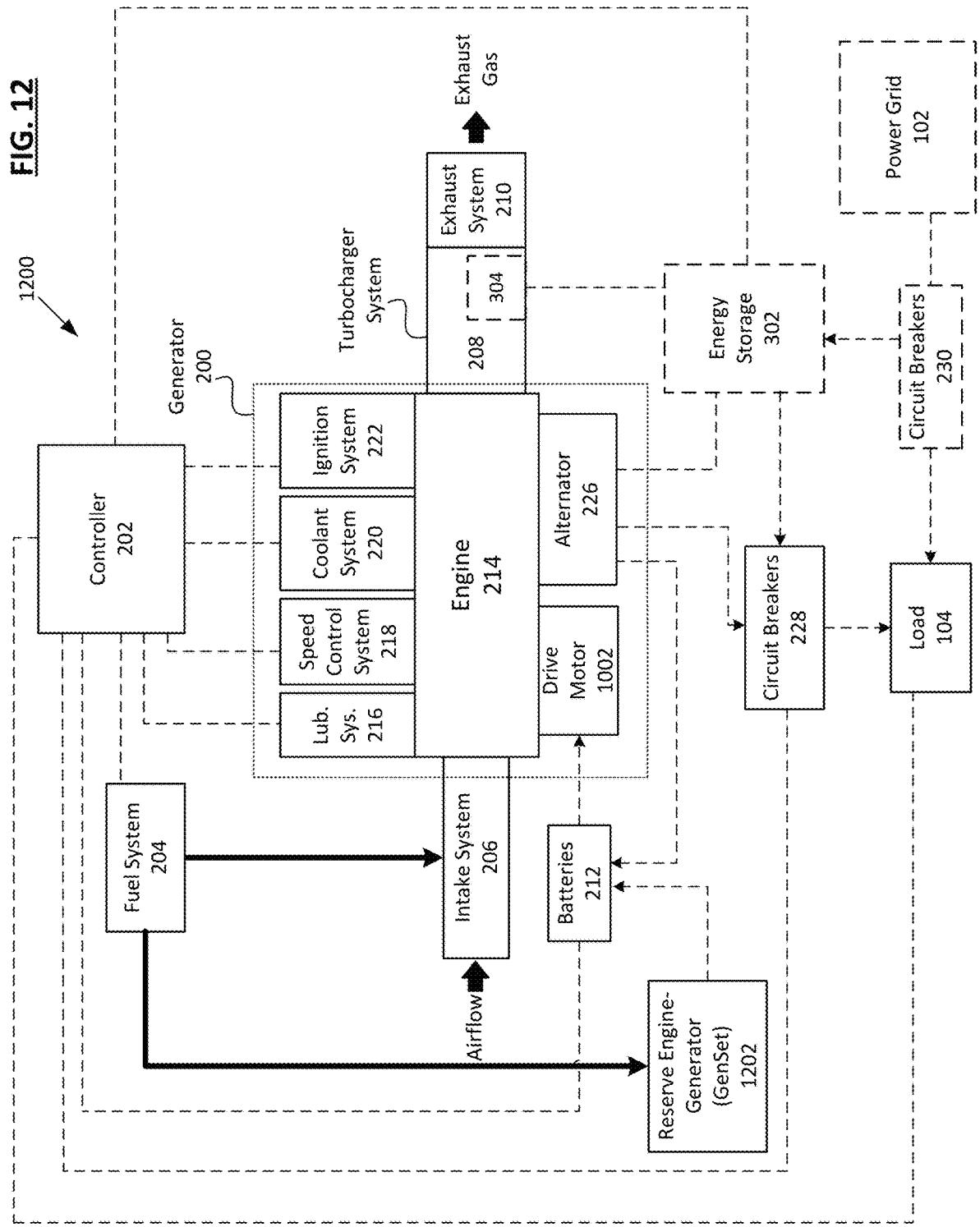

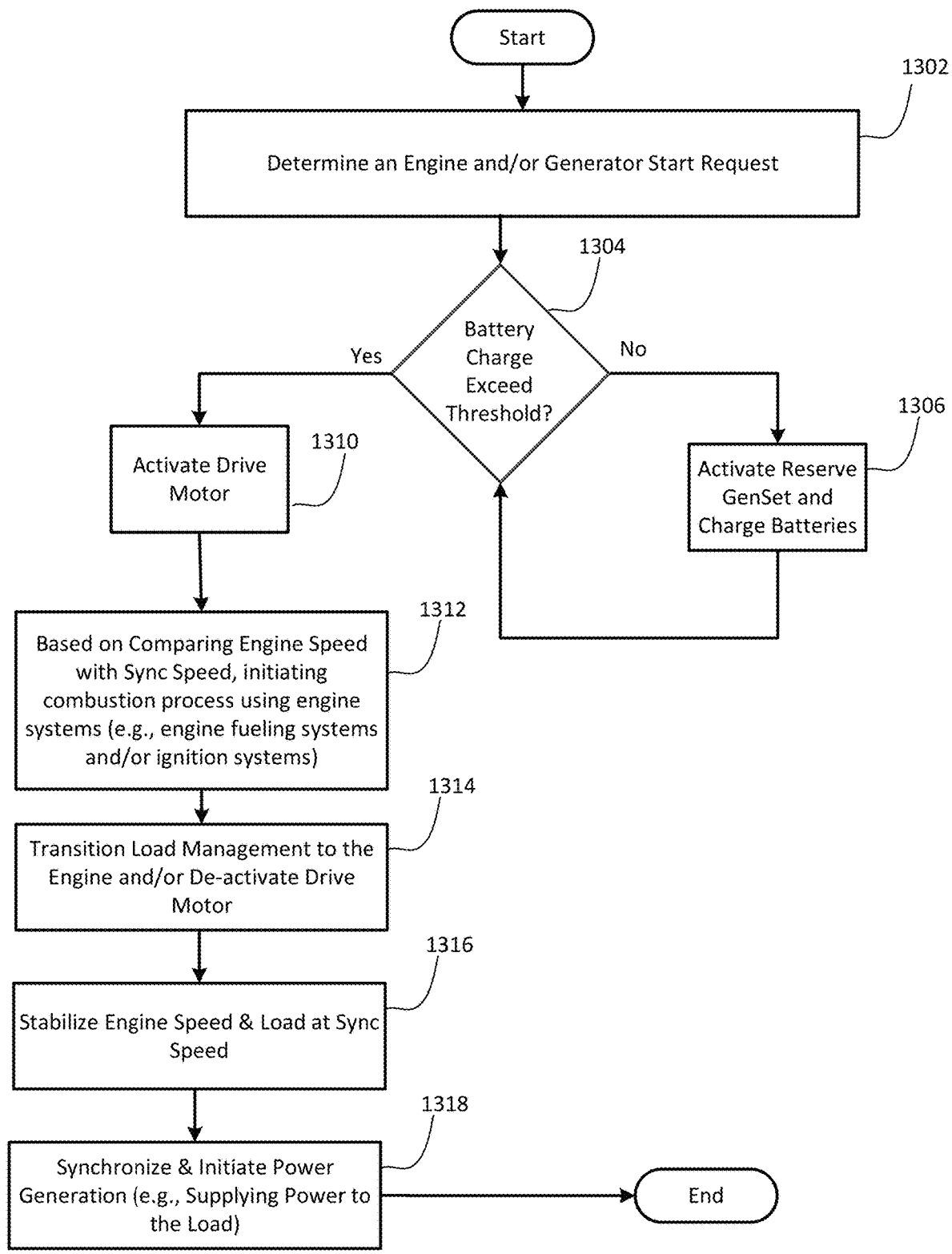

METHOD AND SYSTEM FOR REDUCING A STARTUP TIME OF A GENSET

CROSS-REFERENCE TO RELATED APPLICATIONS

The present application claims priority to U.S. Provisional Application Ser. No. 62/912,126, filed Oct. 8, 2019, and titled "METHOD AND SYSTEM FOR REDUCING A STARTUP TIME OF A GENSET," and to U.S. Provisional Application Ser. No. 62/810,706, filed Feb. 26, 2019, and titled "METHOD AND SYSTEM FOR REDUCING A STARTUP TIME OF A GENSET USING ENERGY STORAGE," the complete disclosures of both are expressly incorporated by reference herein.

FIELD OF THE DISCLOSURE

The present disclosure relates generally to controlling generator sets (gensets), especially to controlling gensets to produce power to supply to a utility grid or a load.

BACKGROUND OF THE DISCLOSURE

Gensets are used extensively for power generation that starts when the power fails in buildings or sites, such as hospitals, data centers, shopping centers, factories, etc. Gensets are also used to provide power to power grids, used as capacity reserves, or as peak shaving mechanisms. Gensets normally include a prime mover such as an internal combustion (IC) engine that converts fuel into mechanical power to rotate an alternator, or generator. An alternator converts the mechanical energy into useable electrical energy at a line voltage and frequency most suitable for transmission and utilization.

Starting a genset which has been shut down for a time period can involve a substantial time delay, transitory difficulties in control and lack of power output before the genset is operable to provide full power to a load which can include a utility grid network. Therefore, prior art gensets face the challenge of requiring an undesirably long span of time after the gensets are activated in which no power is provided.

FIG. 1 shows a typical electricity distribution system during a normal operating condition 100 and during a power outage 114, where the system during condition 100 includes a utility grid 102, also referred to as a power grid, providing electricity to a load 104 which includes for example computing devices 106, home appliances 108, and data centers 110. During normal operating conditions, the grid 102 provides sufficient power to the load 104 with a genset 112 disconnected from the grid 102 and acting as a backup power generator. In the power outage condition 114, the system replaces the grid 102 with the genset 112 to provide power to the load 104 while the utility company addresses the problems which caused the power outage in the utility grid 102. In the interim, the grid 102 is disconnected from the genset 112 to avoid electricity flowing into the utility grid 102 which could interfere with the repair efforts. Also, as an alternate example, during the normal operating condition 100, the genset 112 can be connected to and actively providing power to the grid 102 as a capacity reserve, in which the power company operating the grid 102 may purchase electricity produced from the genset 112 at a predetermined price. In another example, the genset operates in a peak shaving mode to provide some of the electricity needed by the load 104 such that peak electricity demand is reduced for the grid 102. One advantage of this configuration is that a user of the grid 102 is charged a "demand charge" which is based on the peak power consumed by the user, so the peak shaving supplements the power from the grid to suppress this peak, thereby lowering the utility bill for the user.

FIG. 2 illustrates the components of a typical known genset 112 as shown in FIG. 1. In FIG. 2, the broken lines indicate electrical flow (which includes electrical signals and electrical power), and the solid bold lines indicate mass flow (which includes liquid and gas). The main components of the genset 112 are: a generator 200, a controller 202, a fuel system 204, an intake system 206, a turbocharger system 208, an exhaust system 210, and one or more batteries 212. The components of the generator 200 are: an engine 214, a lubrication system 216, a speed control system 218, a coolant system 220, an ignition system 222, a starter motor 224, and an alternator 226. The genset 112 is coupled to a set of circuit breakers 228 which connects the genset 112 to the load 104, and the load 104 is coupled to another set of circuit breakers 230 which connects the load 104 to the power grid 102.

When the power grid 102 stops providing power to the load 104, the circuit breakers 230 open to disconnect the load 104 from the power grid 102. At the same time, the controller 202 detects that the load 104 is not receiving power from the grid 102 and activates the genset 112. Specifically, a start signal is sent to the genset 112, and the batteries 212 power the starter motor 224 to bring the engine 214 to a cranking speed, which is typically about 150 rpm. Once the engine 214 has reached the cranking speed, fuel is added from the fuel system 204 into the intake system 206, along with air intake as indicated by the arrow depicting airflow. For a synchronous motor, the engine 214 starts and is accelerated to a synchronous speed, i.e. the speed at which the magnetic field in the motor rotates, as determined by the frequency of the AC supply current of the grid 102. If the AC supply current is 50 Hz, the synchronous speed is typically 1500 rpm, and if the AC supply current is 60 Hz, the synchronous speed is typically 1800 rpm, for example. FIG. 6 illustrates the engine speed curve 600 of the prior-art genset 112 from when the genset 112 is activated (i.e. at time "0") to when the genset 112 reaches the synchronous speed at time "A".

When the engine 214 reaches synchronous speed, the engine speed is stabilized. When the output phase of the alternator 226 matches a desired frequency and phase, the circuit breakers 228 close and connect the output of the alternator 226 to the load 104. Once the alternator 226 connects to the load 104, the engine 214 then starts to build power, where the power built is primarily limited by the rate at which a speed of the turbocharger in the turbocharger system 208 increases. FIG. 7 illustrates a power curve 700 of the power generated by the prior-art genset 112 in relation to time elapsed since the activation of the genset 112. Because gensets can generate power only after reaching synchronous speed, the point where the curve leaves the x-axis indicates the start of power generation by the genset. As such, for the prior-art genset 112, the power generation begins at time "A" on FIG. 7, and plateaus when it reaches 100%, i.e. the target power. This process can take several minutes for large spark-ignited engines, while some diesel engine-based gensets can complete this process in approximately 10 seconds. However, even this is too slow for some applications which require immediate backup power in case of a power outage, such as computers and data centers which could experience undesired shutdowns if no power is provided for even 10 seconds, let alone several minutes.

Therefore, there is a need to provide a genset which has a short startup time and is capable of generating the target power level in a much shorter time than was previously possible with the prior art gensets, and in some cases providing almost instantaneous power to the load.

SUMMARY OF THE DISCLOSURE

Various embodiments of the present disclosure relate to methods and apparatuses to reduce a startup time of a genset for providing requested power to a utility grid or a load. The genset includes a generator, a turbocharger, and an energy storage device coupled to at least one of the generator and the turbocharger. The genset further includes a controller, and the generator includes an engine. The genset responds to a genset start signal which, in one example, is caused by a determination that the utility grid is not providing power to the load, and accelerates an engine speed of the generator to reach a synchronous speed by activating the energy storage device to supply power to the at least one of the generator and the turbocharger. Subsequently, the generator supplies power to the utility grid or load. In some embodiments, the controller detects a condition that the utility grid is not providing power to the load, and then responds to the condition by activating the energy storage device to supply power to the at least one of the generator and the turbocharger and the load to accelerate the engine speed of the generator more rapidly to reach the synchronous speed. This provides virtually uninterrupted power to the load, even during the period when the genset is accelerating to reach the synchronous speed. In another embodiment, the energy storage provides power directly to the load.

In one embodiment, the generator further includes an alternator, and the turbocharger includes a shaft and a motor-generator. Furthermore, the energy storage device includes at least one of a battery and a supercapacitor which supplies electrical power to at least one of the alternator and the motor-generator. In this example, the at least one of the battery and the supercapacitor is pre-charged by the utility grid and maintained at a high-power state prior to being activated. In one aspect of the embodiment, the genset responds to the genset start signal by disconnecting the utility grid from the load prior to activating the at least one of the battery and the supercapacitor. In another aspect of the embodiment, the genset responds to the genset start signal by having the at least one of the battery and the supercapacitor supply power to the load after the utility grid is disconnected from the load.

In one example, the at least one of the battery and the supercapacitor stabilizes the engine speed by: absorbing excess power supplied by the at least one of the alternator and the motor-generator if the engine speed is too high, or providing power to the at least one of the alternator and the motor-generator if the engine speed is too low. In one example, the at least one of the alternator, the motor-generator, and the utility grid recharges the at least one of the battery and the supercapacitor when the genset is operating at a desired power level. In another example, the motor-generator increases a turbocharger speed by supplying power to the shaft of the turbocharger. In yet another example, the motor-generator stabilizes a turbocharger speed by absorbing power from the shaft. The motor-generator then supplies electrical power by converting the absorbed power into the electrical power. Finally, the at least one of the battery and the supercapacitor absorbs the electrical power supplied by the motor-generator. In another example, at least one of the load and the grid absorbs the power supplied by the motor-generator.

In one embodiment, the turbocharger includes a shaft, and the energy storage device includes at least one flywheel configured to supply power to at least one of the engine and the shaft. In another embodiment, the at least one flywheel is configured to supply power to the alternator or a coupling that connects the engine to the alternator. The at least one flywheel is maintained at a high-power state prior to being activated, and the genset responds to the genset start signal that the utility grid is not providing any power to the load by disconnecting the utility grid from the load prior to activating the at least one flywheel. In one aspect of the embodiment, a rate at which the engine speed increases, i.e. an engine acceleration, is reduced when the engine speed is within a predetermined threshold from the synchronous speed. In one aspect of this embodiment, the energy storage device includes a pair of flywheels: a first flywheel coupled to the generator and a second flywheel coupled to the turbocharger. Both of these flywheels are maintained at a high-power state prior to being activated. In this case, the controller responds to the detected condition in which the utility grid is not providing power to the load by activating the first flywheel to supply power to the engine and the second flywheel to supply power to the shaft, in order to accelerate the engine speed of the generator to reach the synchronous speed. Also, in this case, the controller reduces the rate at which the engine speed increases when the engine speed is within a predetermined threshold from the synchronous speed by deactivating one or both of the first and second flywheels. In one example, the generator includes at least one of: a spark ignition engine and a compression ignition engine. In another example, the power is supplied by the energy storage device while the engine speed increases to approach the synchronous speed. In yet another example, the controller reduces a rate at which the engine speed increases when the engine speed is within a predetermined threshold from the synchronous speed by feeding the power back into the flywheels.

In yet another embodiment, the genset includes a controller which receives a signal from the utility grid requesting the genset to deliver electrical power to the utility grid. In response to receiving the signal, the controller accelerates an engine speed of the generator to reach a synchronous speed using electrical power supplied by the utility grid to at least one of the alternator and the motor-generator. Then, the alternator of the generator supplies the electrical power to the utility grid. In one example, the genset includes an energy storage device which stabilizes the engine speed by absorbing excess electrical power supplied by the alternator if the engine speed is too high, and/or providing power to the alternator if the engine speed is too low.

In some examples, the genset initiates a combustion process of the engine to occur using one or more engine systems based on comparing the engine speed with the synchronous speed. The genset supplies power to the utility grid or load based on initiating the one or more engine systems. In some instances, the genset initiates the combustion process based on determining the engine speed is less than the synchronous speed by a pre-determined threshold and greater than the cranking speed. In some variations, the genset initiates the combustion process based on determining the engine speed reaches the synchronous speed. In some examples, the genset provides one or more signals to de-activate the drive motor based on the engine speed reaching the synchronous speed and initiating the combustion process. In some instances, the drive motor is a high torque industrial electrical motor.

In yet another embodiment, a method and system of reducing a startup time of a genset system for providing requested power to a load is provided. The genset system includes an engine, one or more batteries, a controller and a drive motor. The controller is configured to determine a start condition for the genset system, activate the drive motor to ramp up an engine speed of the engine past a cranking speed and to a synchronous speed, and supply, using the genset system, power to the load based on using the drive motor to ramp the engine speed to the synchronous speed.

In some examples, the controller monitors, using an engine speed sensor, the engine speed of the engine, initiates a combustion process of the engine to occur using one or more engine systems based on comparing the engine speed with the synchronous speed, and supplies the power to the load is based on the initiating the combustion process. In some instances, the controller de-activates the drive motor based on the engine speed of the engine reaching the synchronous speed and initiating the combustion process. In some variations, the controller initiates the combustion process based on determining the engine speed is less than the synchronous speed by a pre-determined threshold and greater than the cranking speed.

In some examples, the controller initiates the combustion process based on determining the engine speed reaches the synchronous speed. In some instances, the drive motor is a high torque industrial electrical motor. In some variations, the controller activates the drive motor to ramp up the engine speed to the synchronous speed is based on determining a battery charge of the one or more batteries exceeds a threshold. In some instances, the controller cancels a start request for the genset system and causing display of a prompt indicating the cancellation of the start request based on determining the battery charge of the one or more batteries fails to exceed the threshold.

In some examples, the genset system comprises a reserve genset. The controller activates the reserve genset to charge the one or more batteries based on determining the battery charge of the one or more batteries fails to exceed the threshold, determines whether the battery charge of the one or more batteries exceeds the threshold subsequent to activating the reserve genset, and supplies the power to the load in response to the battery charge of the one or more batteries exceeding the threshold.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The embodiments will be more readily understood in view of the following description when accompanied by the below figures and wherein like reference numerals represent like elements. These depicted embodiments are to be understood as illustrative of the disclosure and not as limiting in any way.

FIG. 1 is a set of schematic diagrams of a system with a load, grid, and genset in both a normal operation condition and during a power outage;

FIG. 8 is a flow chart illustrating a method of reducing a startup time of a genset for providing requested power to a utility grid or a load as described herein;

FIG. 9 is a flow chart illustrating a method of reducing a startup time of a genset for providing requested power to a utility grid as described herein;

FIG. 11 is a flow chart illustrating a method of reducing a startup time of a genset for providing power to a load as described herein;

FIG. 12 is another schematic diagram of a genset as disclosed herein, which includes a drive motor; and FIG. 13 is another flow chart illustrating a method of reducing a startup time of a genset for providing power to a load as described herein.

Figure 2:
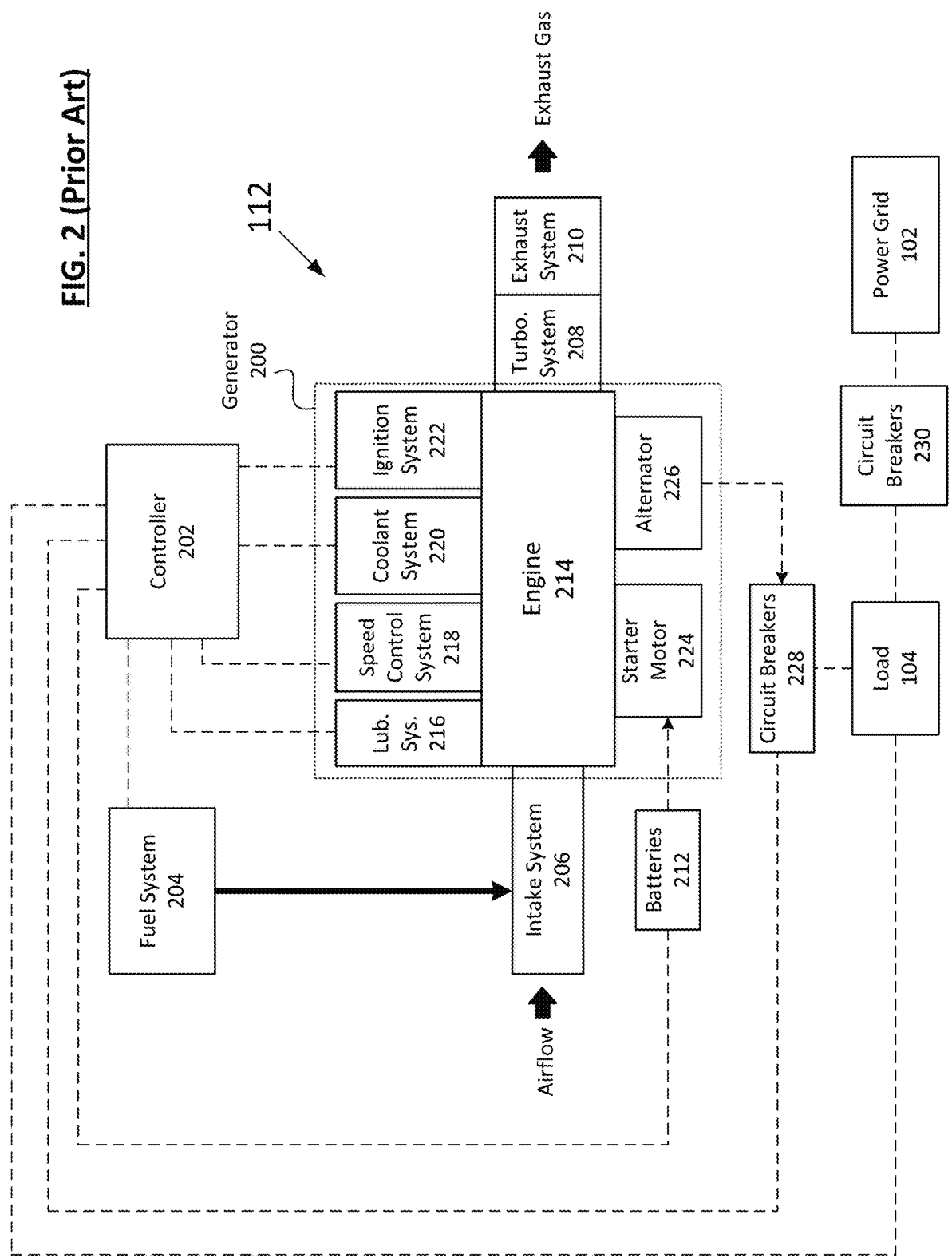
FIG. 2 is a schematic diagram of a prior-art genset as shown in FIG. 1.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

Figure 3:
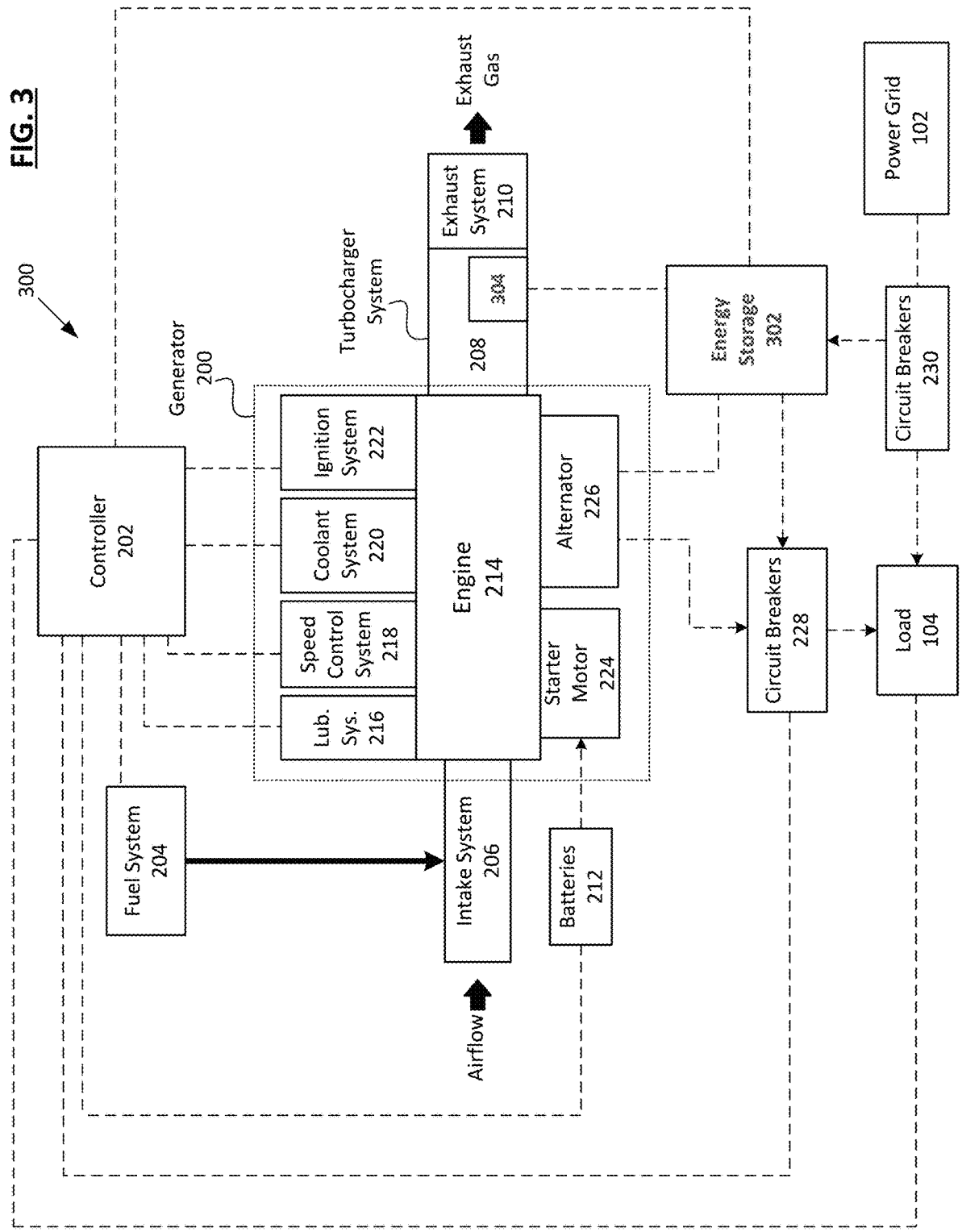
FIG. 3 is a schematic diagram of a genset as disclosed herein, which uses an electrical energy storage.

FIG. 3 illustrates an example of a genset system 300 as disclosed herein. The genset 300 includes a generator 200, a controller 202, a fuel system 204, an intake system 206, a turbocharger system 208, an exhaust system 210, and one or more batteries 212. The generator 200 includes an engine 214, a lubrication system 216, a speed control system 218, a coolant system 220, an ignition system 222, a starter motor 224, and an alternator 226. The genset 300 further includes an energy storage device 302 electrically coupled to the alternator 226 of the generator 200 and a motor-generator 304 of the turbocharger system 208, as well as to the controller 202 and the circuit breakers 228 and 230. In some examples, the energy storage device 302 can be coupled to either one of the alternator 226 and the motor-generator 304. The engine 214 can be any appropriate engine to be used in a generator, such as a spark ignition-based engine and a compression ignition-based engine, among others. The fuel system 204 can use any appropriate type of fuel used in spark ignition-based engines, including but not limited to natural gas, propane, gasoline, hydrogen, and other gas phase fuels which includes digester gas, bio gas, producer gas, landfill gas, pipeline gas, etc. Furthermore, propane can be any fuel that consists of more than 50% propane, such as liquefied petroleum gas (LPG), for example. The types of fuels that compression ignition-based engines can run on include, but are not limited to, diesel, kerosene, jet fuel, heavy fuel oil, etc.

In one example, the energy storage device 302 is a battery or a set of batteries, or a set of supercapacitors, although any other suitable energy storage device medium can be employed as appropriate. The functions of the energy storage device 302 as well as the genset 300 are explained in detail below. Note that in FIGS. 3 and 4, the broken lines indicate electrical flow (for example, electrical signal and transfer of electrical energy), while the bold solid lines indicate other types of flow (for example, fluid flow and transfer of mechanical energy) as further explained herein.

In a normal operating condition, i.e. the operating condition 100 as shown in FIG. 1, the power grid 102 is electrically connected to the energy storage device 302 such that the energy storage device 302 is maintained at a high charge level, e.g. near 100% of its capacity, by having electrical power supplied from the power grid 102 while the power grid 102 supplies power to the load 104. When there is a power failure, i.e. during the power outage 114 shown in FIG. 1, the controller 202 detects the outage using sensors, for example, that measure power within the system, and sends start signals to each of the components of the genset 300 to activate the genset 300. Collectively, these signals are referred to as a genset start signal. For example, a start signal is sent to the controller 202 which activates the batteries 212 to provide power to activate the starter motor 224, as well as to each of the lubrication system 216, speed control system 218, coolant system 220, and ignition system 222 of the genset 300. In addition, a start signal is sent to the energy storage device 302 such that the energy storage device 302 is activated and sends electrical power to the genset 300.

In one example, the energy storage device 302 acts as the uninterruptible power supply (UPS) to the load 104 by supplying electrical power to the load 104 immediately after the outage occurs, independently of the alternator 226. To do so, in one aspect of the disclosure, the energy storage device 302 is capable of providing as much power as the alternator 226 can deliver at full load, such as 1 megawatt (MW), for instance. The energy storage device 302 instantly begins supplying enough power to meet the power demand of the load 104 (i.e., 100% of the generated power) for an amount of time long enough for the engine 214 to reach synchronous speed, after which the alternator 226 takes over and provides the power to the load 104. Note that the energy storage device operates in DC while the load expects AC power, so an inverter is used to convert the DC power from the energy storage device into AC, as would be understood by person skilled in the art. As such, the energy storage device 302 acts as the UPS for the load 104. In one example, the roles of the batteries 212 and the starter motor 224 are replaced with the energy storage device 302 and the alternator 226, respectively. That is, instead of using the power supplied by the batteries 212 to activate the starter motor 224 for the engine 214 to start building speed, the energy storage device 302 supplies power to the alternator 226 which in turn builds up speed in the engine 214.

In another example, the energy storage device 302 provides electrical power to the alternator 226 of the generator 200 to power the engine 214 as the engine 214 builds speed, and the energy storage device 302 additionally provides power to the motor-generator 304 of the turbocharger system 208 to activate the turbocharger. The motor-generator 304 can be any suitable motor-generator used in a turbocharger, for example a permanent magnet alternator (PMA), such that the motor-generator can both supply mechanical power to the shaft of the turbocharger and absorb the mechanical power from the shaft to convert it to electrical power. In some examples, the motor-generator 304 is replaced with a motor which supplies power to the shaft of the turbocharger in a unidirectional manner, or is configured such that the motor-generator can be used as just a motor, just a generator, or both depending on the implementation in the genset. In another embodiment, the energy storage device 302 is coupled to the motor-generator 304 without being coupled to the alternator 226. In this embodiment, the energy storage device 302 provides power solely to the motor-generator 304 to activate the turbocharger, and the energy storage device 302 can also absorb power from the turbocharger, when that is advantageous, for example, to regulate the boost pressure of the engine.

Figure 5:
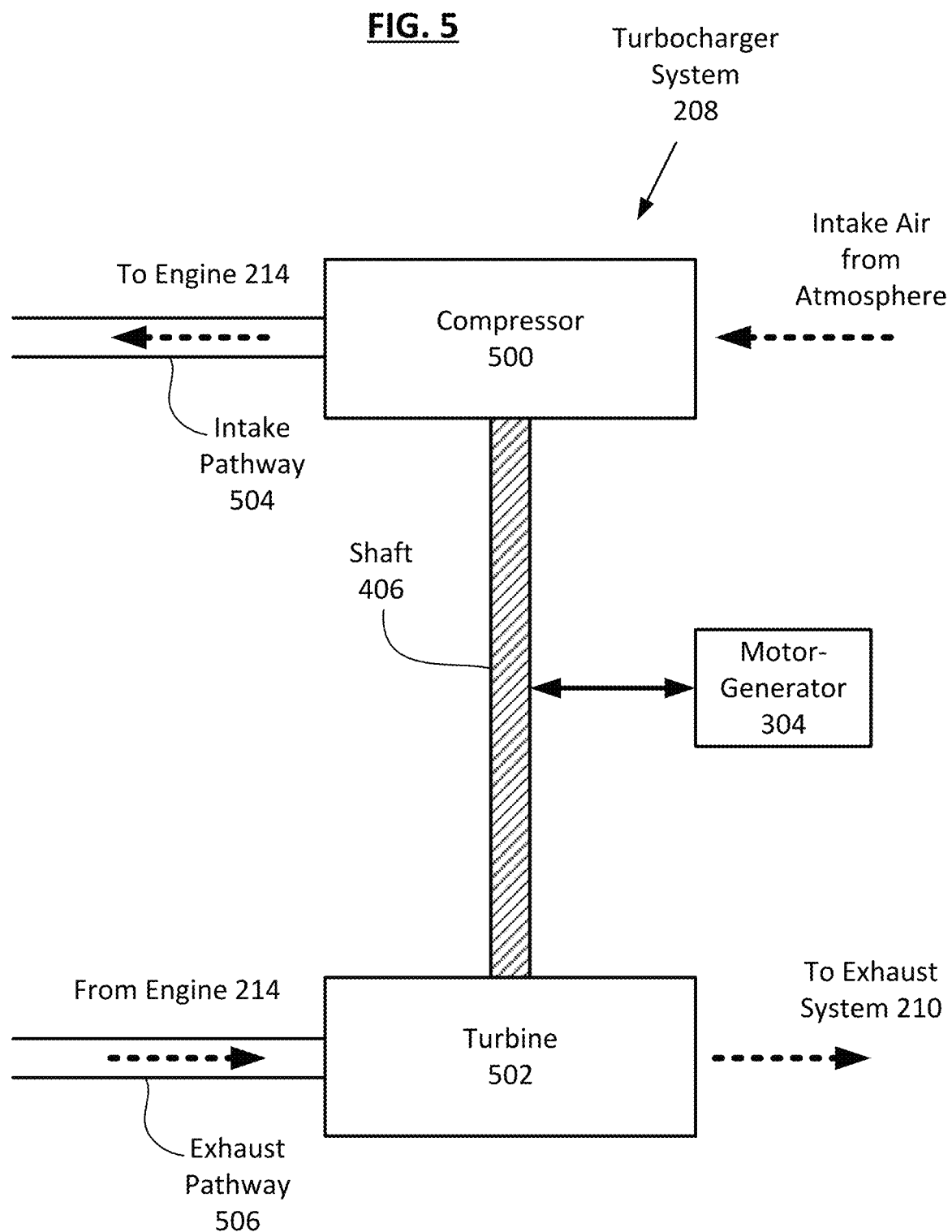
FIG. 5 is a schematic diagram of a turbocharger as used in the genset disclosed in FIGS. 3 and 4.

As illustrated in FIG. 5, a turbocharger 208 includes a compressor 500 to deliver air from the atmosphere to the engine 214 through an intake pathway 504, a turbine 502 which rotates in response to the exhaust gas from the engine 214 passing from an exhaust pathway 506, through the turbine 502 to the exhaust system 210, a shaft 406 connecting the compressor 500 to the turbine 502, and the motor-generator 304 which provides mechanical torque to the shaft 406 to rotate. When the motor-generator 304 receives electrical power from the energy storage device 302, the motor-generator 304 turns the shaft 406 so the turbocharger takes in more air from the atmosphere and delivers it to the engine 214, creating more boost. In one example, the motor-generator 304 is also capable of absorbing excess mechanical power from the shaft 406 to reduce the speed of the turbocharger 208. In another aspect of the disclosure, the RPM of the turbocharger can be modulated using sensors, for example, which detect the speed of the turbocharger so that a warning signal is sent to the controller when the turbocharger speed increases too rapidly, or is too high. Advantages in having such sensors include preventing excessive turbocharger speed which can damage the turbocharger.

As the engine speed builds up and reaches a cranking speed, fuel is added from the fuel system 204 into the intake system 206 and/or a combustion chamber of the engine. Due to the boost of incoming air from both the intake system 206 and the turbocharger 208, more air is available inside the engine 214 which allows for an increase in the amount of fuel delivered to the engine 214 used in the generator 200, enabling the engine 214 to build up more speed.

Figure 6:
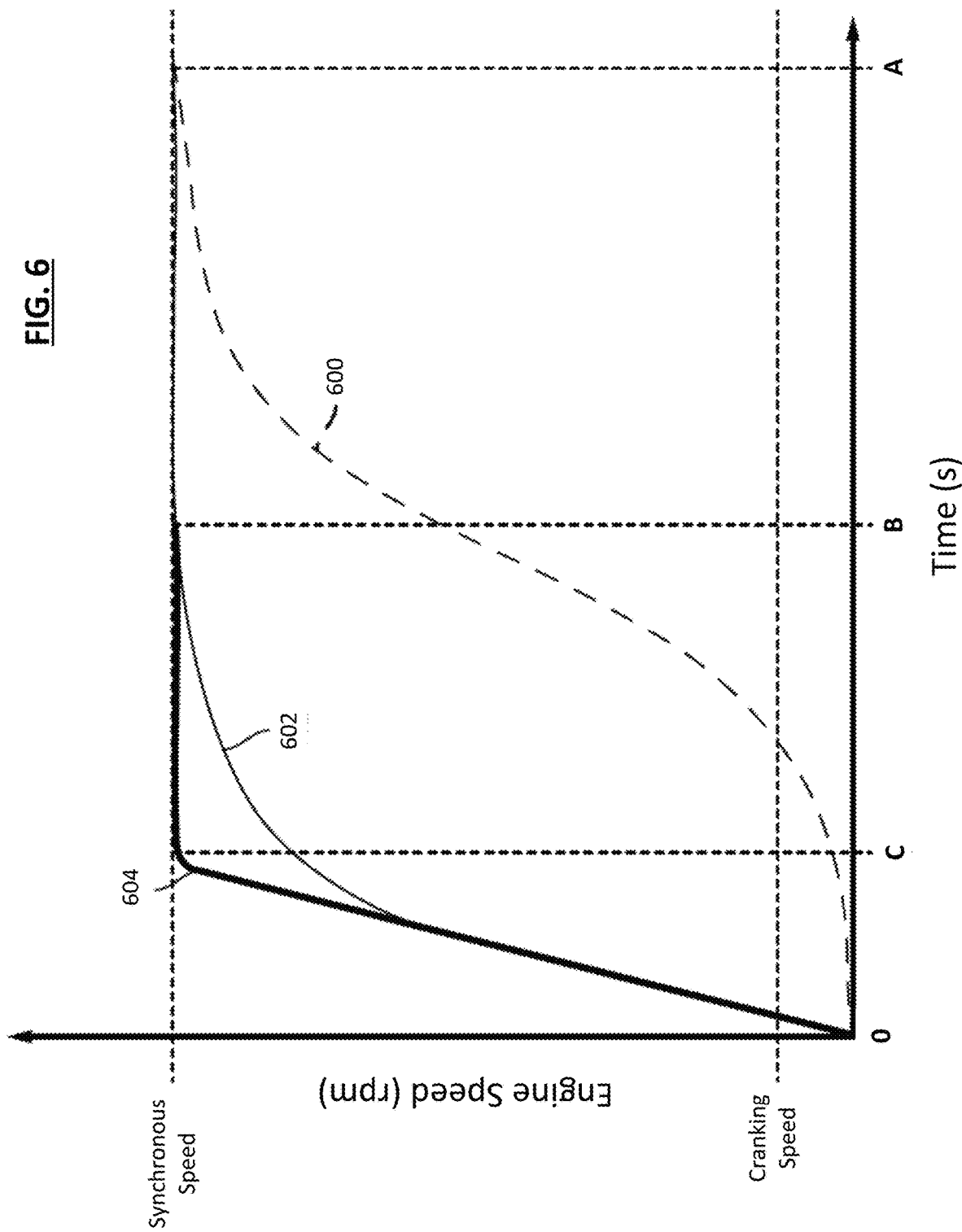
FIG. 6 is a graph comparing the startup engine speed curves of the prior-art genset as shown in FIGS. 1 and 2 with two embodiments of the genset as disclosed herein.
Figure 7:
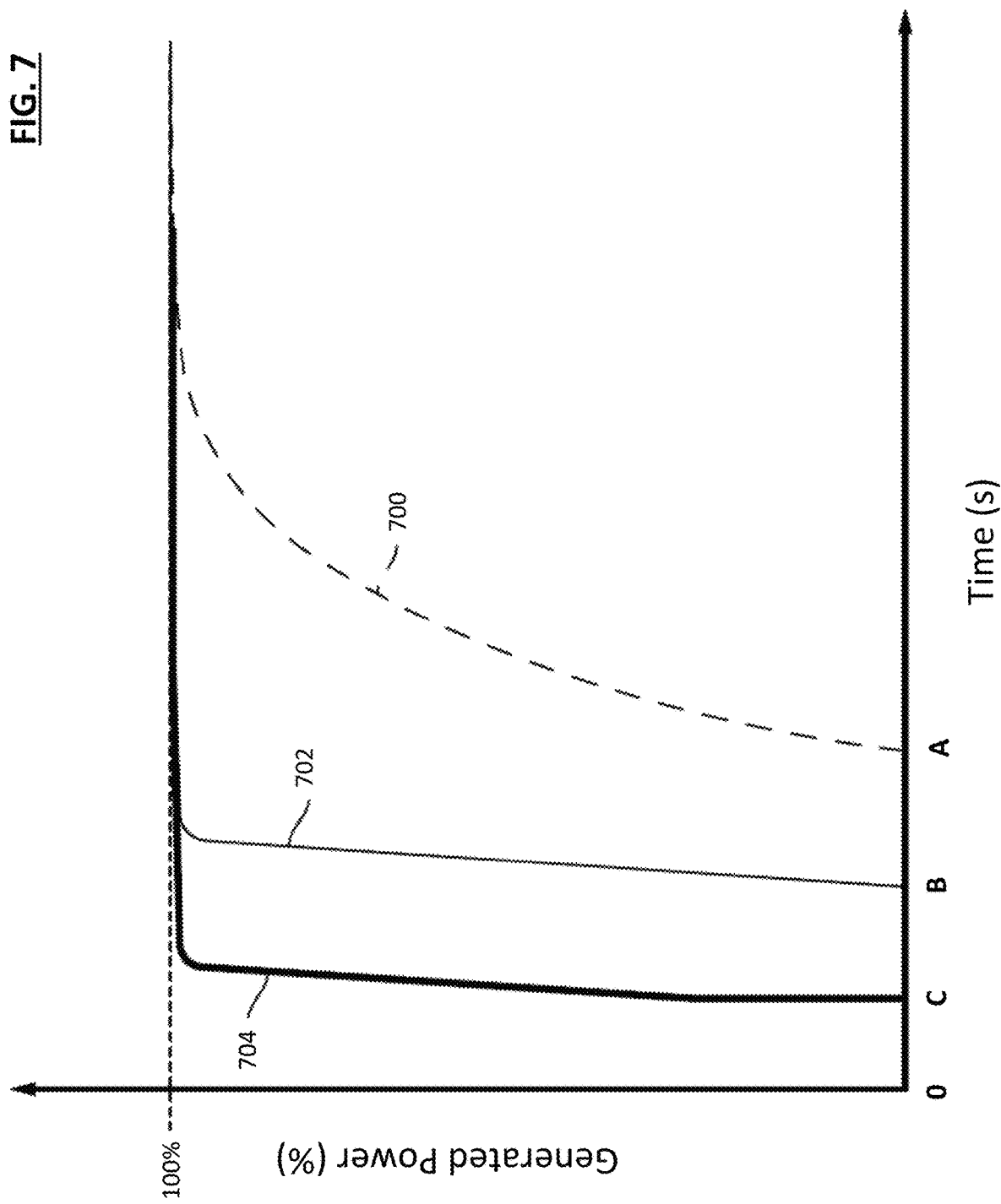
FIG. 7 is a graph comparing the generated power curves of the prior-art genset as shown in FIGS. 1 and 2 with two embodiments of the genset as disclosed herein.

In one embodiment, as the engine speed approaches the synchronous speed, the controller 202 sends signals to the energy storage device 302 to reduce the amount of power supplied to the alternator 226 and the motor-generator 304, thereby decreasing the rate at which the engine speed is increasing (i.e. engine acceleration) to stabilize the engine speed when the synchronous speed is reached. In one embodiment, such decrease in the engine acceleration occurs when the engine speed reaches a certain predetermined threshold. For example, assuming the synchronous speed of 1800 rpm for an AC supply current of 60 Hz, the threshold can be 1700 rpm, after which the engine acceleration decreases so that the engine speed reaches 1800 rpm without overshooting the target speed, although any other threshold value less than the synchronous speed can be used as appropriate for this purpose. For example, a governor is implemented to determine the speed relative to a threshold, which uses factors such as (1) the difference between the actual speed and the target speed, (2) the rate at which the target speed is approached, or (3) the integral of the difference. Typically, all three of the above factors are combined in a "PID" controller. The engine speed curve 602 in FIG. 6 reflects this method of engine speed stabilization. The genset 300 begins to generate power after the engine speed reaches the synchronous speed. FIG. 7 illustrates the generated power curve 702 of the genset 300 for this embodiment. At time "B", the genset 300 achieves synchronous speed and begins generating power, which is earlier than the prior art genset 112, which achieves the same speed at time "A", much later than the genset 300. The genset 300 also achieves 100% power generation, also referred to herein as a target or desired power level, much earlier than does the prior art genset 112.

In another embodiment, the energy storage device 302 absorbs the excess power generated by the genset 300, essentially acting as a brake, to stabilize the engine speed and to match the phase of the alternator 226 with that of the load 104. Therefore, the controller 202 does not need to reduce the rate at which the engine speed is increasing, allowing the engine speed to reach the synchronous speed earlier than otherwise possible. This method of engine speed stabilization is reflected in the engine speed curve 604 in FIG. 6. When the engine speed reaches the synchronous speed at time "C", the genset 300 quickly builds power and the motor-generator 304 absorbs the excess mechanical power from the turbocharger 208, converts it into electrical power, and supplies the electrical power to the energy storage device 302, thereby stabilizing the engine speed. FIG. 7 illustrates the generated power curve 704 of the genset 300 in this embodiment, and it is apparent that the curve 704 reaches 100% power earlier than the curve 702. As such, in the case of the spark ignition engine, by providing the ability to add power to the turbocharger, or to slow down the turbocharger, the engine can be operated at the target speed with the throttle wide open, which improves efficiency of the engine. The speed would be controlled by modifying the charge mass flow through the engine, thus controlling the power. This would also prevent the turbocharger from over-speeding, especially if a smaller turbine is used. Moreover, this allows the use of a smaller turbine, which improves the ability of the turbocharger to spool up during transients.

Afterwards, the circuit breakers 228 close to electrically couple the genset 300 with the load 104 for the genset 300 to provide electrical power to the load 104. Although the genset 300 is generating significant power, if the genset 300 is still not generating enough power to meet the demand of the load 104, the energy storage device 302 continues to fill the gap between the power provided by the genset 300 and the power demand from the load 104. The energy storage device 302 also continues to supply power to the motor-generator 304 of the turbocharger 208 to help reach target speed or to maintain at the target speed once it is reached, as load is applied to the genset.

When the genset 300 generates sufficient power to match the power demand from the load 104, the engine 214 of the genset 300 can operate at a slightly higher power than is demanded so as to recharge the energy storage device 302 with the excess power generated by the genset 300, similar to how the energy storage device 302 is kept at high charge level from the power supplied by the grid 102 during normal operating conditions. In one example, the energy storage device 302 is charged to a predetermined level, e.g. 80% of its capacity, to allow the energy storage device 302 to act as a support power source for stabilizing engine speed, when necessary.

In one example, the genset 300 experiences load shedding caused by a drop in the load applied to the genset. This load shedding event occurs when there is a sudden drop in the load applied to the genset, either because a load is intentionally removed (such as by opening a circuit breaker), or due to a failure in the grid. The latter is also referred to as "low voltage ride through" (LVRT). In this case, with nothing to restrain the engine, the engine speed tends to overshoot, potentially resulting in a shutdown of the genset. By using the generator as a brake, this over-speed event can be prevented when the excess power that the engine generates is sent to the energy storage device 302. Therefore, the energy storage device 302 acts as a brake to absorb the excess electrical power generated by the alternator 226. The engine speed is then reduced using the motor-generator 304 to absorb mechanical power from the turbocharger 208, which is converted into electrical power to be absorbed by the energy storage device 302. The result is a stable engine speed and electrical frequency during the load shedding maneuver. As a result of absorbing excess electrical power from both the alternator 226 and the motor-generator 304, the energy storage device 302 is at a higher charger level than before the load shedding event, which allows the energy storage device 302 to prepare for a possible load acceptance event that is anticipated in the future, i.e. when more load is added such that the power demand for the genset 300 increases. The energy storage device 302 in this case is kept at a predetermined target level, for example 90% of its capacity, to accommodate for any sudden increase in the amount of power demanded by the load 104.

When the power demand explained above takes place, i.e. the power acceptance event, the energy storage device 302 supplies electrical power to the alternator 226 or directly to the load 104 to bridge the gap between the power provided by the genset 300 and the power demand from the load 104, while the engine 214 is building speed to achieve the synchronous speed needed to start generating power. Additionally, power is also added to the motor-generator 304 of the turbocharger 208 to allow the turbocharger to spool up quickly. Advantages of this approach include the genset having the ability to provide power almost instantaneously to the load while providing excellent transient response, i.e. load shedding and load acceptance, as well as excellent frequency stability. Moreover, the aforementioned genset system can also handle the most demanding "low voltage ride through", i.e. the capability to stay connected in short periods of lower electric network voltage, as well as other grid compliance requirements.

Figure 4:
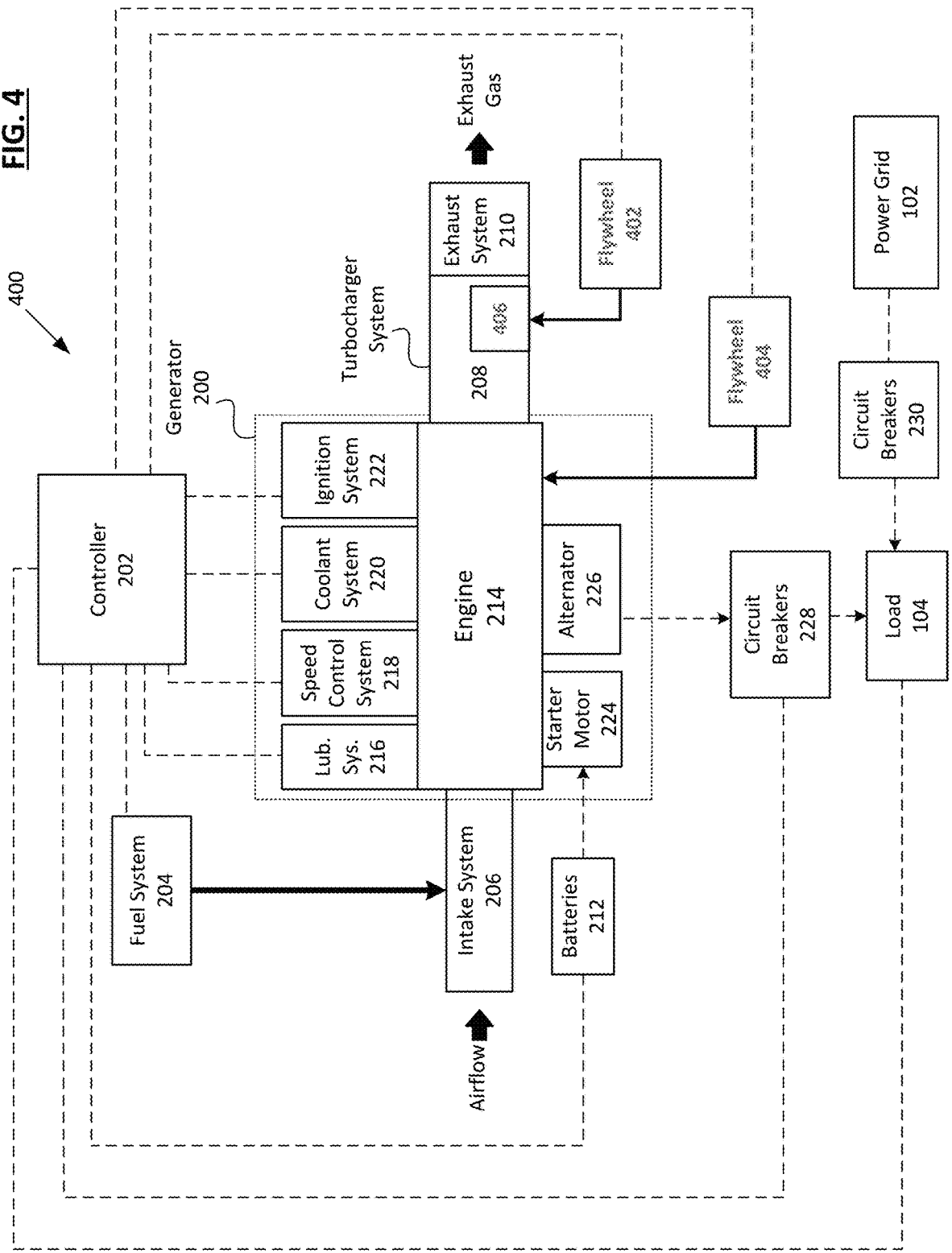
FIG. 4 is a schematic diagram of a genset as disclosed herein, which uses a pair of flywheels.

FIG. 4 illustrates an example of a genset system 400 which includes a set of flywheels 402 and 404 mechanically coupled to the engine 214 of the generator 200 and a shaft 406 of the turbocharger system 208, respectively. The flywheels 402 and 404 are also electrically coupled to the controller 202 to be activated by the controller. In one example, the flywheels 402 and 404 are part of flywheel energy storages that use electricity to accelerate and decelerate the flywheel composed of rotors suspended by magnetic bearings in a vacuum enclosure, for example, although any other suitable flywheel energy storage device can be employed as appropriate. The functions of the flywheels 402 and 404 as well as the genset 400 are explained in detail below.

When the controller 202 detects a power outage and activates the flywheels, the flywheel 402 supplies mechanical power to the engine 214, and the flywheel 404 supplies mechanical power to the shaft 406 (shown in FIG. 4 using solid bold unidirectional arrows). In a different embodiment, the flywheel can also generate electrical power to provide to the system. As illustrated in FIG. 5, the turbocharger 208 uses the shaft 406 to drive the compressor 500 and the turbine 502 to deliver more air from the atmosphere into the engine 214. In this example, the engine speed experiences a dramatic increase initially when the genset 400 is activated and fuel is supplied to the engine 214 when the engine speed reaches the cranking speed. As the engine speed approaches the synchronous speed, the controller 202 sends signals to the flywheels 402 and 404 to reduce the amount of power supplied to the turbocharger 208 and the engine 214, thereby decreasing the rate at which the engine speed is increasing to stabilize the engine speed when the synchronous speed is reached. The engine speed curve 602 in FIG. 6 illustrates this method of engine speed stabilization. As such, the controller 202 prevents the engine speed from exceeding the synchronous speed. In another embodiment, the genset system includes an additional compressor and electric motor. The additional compressor is connected in series with or in parallel to the turbocharger 208 such that the boost is created using the additional compressor until the turbocharger is up to speed. In one example, the electric motor is coupled to the additional compressor. In another example, the electric motor is coupled to the turbocharger 208 and a second separate electric motor is coupled to the compressor to assist with the boost. The electric motors can be motor-generators, as appropriate.

In one embodiment, the flywheels 402 and 404 are used in combination with a separate UPS to provide gapless power to the load 104. For example, the UPS can be a set of supercapacitors which provide electrical power to the alternator 226 and the motor-generator 304, while the flywheels provide mechanical power to the engine 214 and the shaft 406. In another embodiment, the UPS provides electrical power directly to the load, allowing the load to continue running without interruption. Advantages of this configuration include dramatically reducing the genset startup time, the time it takes for the engine to reach synchronous speed, and the time it takes for the load to receive 100% of its power demand.

In another embodiment, the energy storage device 302 includes supercapacitors which are used to supply the reactive power element of the load 104 during startup. Advantages in this method includes reducing the size and capacity of the system by approximately 20%. For example, starting up a motor, or providing the power to start up a transformer from a black start, requires a sudden in-rush (typically taking between 2 to 5 seconds) of reactive power, which require the genset 300 to be oversized. Using the supercapacitors to power the reactive elements of the load not only enables downsizing of the genset but also enables operation with a power factor close to 1.0, which means that almost all the supplied power is consumed by the load, therefore improving the efficiency of the genset.

Advantages in having an energy storage device or flywheels to assist in the startup of the genset include reducing the time it takes for the genset to reach power generation of 100% to meet the power demand of the load, allowing for almost gapless, if not actually gapless, power to be supplied to the load during power outages, improving the efficiency of the engine, and reducing the size and capacity necessary for the system, without compromising on the performance.

In yet another example, the genset as described herein is used as a capacity reserve for the utility grid or power grid 102. This may happen, for example, when the utility company has determined that the company is, or soon will be, unable to provide all the power that is requested from the grid. In such a case, the controller 202 receives a signal indicating that the grid 102 needs the genset to generate power to supplement or support the grid 102 in meeting the demand from all the loads. The signal acts as the trigger for the controller 202 to activate the genset. The grid 102 then provides electrical power to the alternator 226 of the generator 200 and the motor-generator 304 of the turbocharger 208 to start the engine 214 to reach the synchronous speed. In this example, the motor-generator 304 can be used as a motor, a generator, or both. The genset in this case can be either the genset 300 or the genset 400. In either case, the energy storage device 302 and the flywheels 402 and 404 can remain deactivated, or omitted entirely from the system, because the power needed to speed up the engine 214 and the turbocharger 208 comes from the grid 102. However, in case of the genset 300, the energy storage device 302 can be used as a brake to stabilize the engine speed, as explained previously herein, after the engine 214 achieves the synchronous speed and the alternator 226 starts generating electrical power. The generated power is then supplied to the grid 102 so that the grid 102 can meet the demand for the loads which receives power from the grid. Similarly, the motor-generator 304 can also be used as the brake as well to stabilize the turbocharger RPM in one example.

FIGS. 8 and 9 show a flow chart illustrating the steps in operating the genset as described herein. FIG. 8 pertains to a method of reducing a startup time of a genset for providing requested power to a utility grid or a load. In step 800, the controller of the genset detects a condition in which the utility grid is not providing power to the load. Then, in step 802, the controller accelerates an engine speed of the generator to reach a synchronous speed by activating the energy storage to supply power to the at least one of the generator and the turbocharger. Finally, in step 804, the generator supplies power to the utility grid or load. FIG. 9 pertains to a method of reducing a startup time of a genset for providing requested power to a utility grid. In step 900, the controller receives a signal from the utility grid requesting the genset to deliver electrical power to the utility grid. Then, in step 902, the controller accelerates an engine speed of the generator to reach a synchronous speed using electrical power supplied by the utility grid to at least one of the alternator and the motor-generator. And finally, in step 904, the alternator supplies the electrical power to the utility grid. In a different embodiment, the signal comes from a remote controller handled by the owner of the genset such that the genset is used in a peak shaving mode to reduce the demand charge and run the genset only when the load is high enough to trigger the demand charge.

Figure 10:
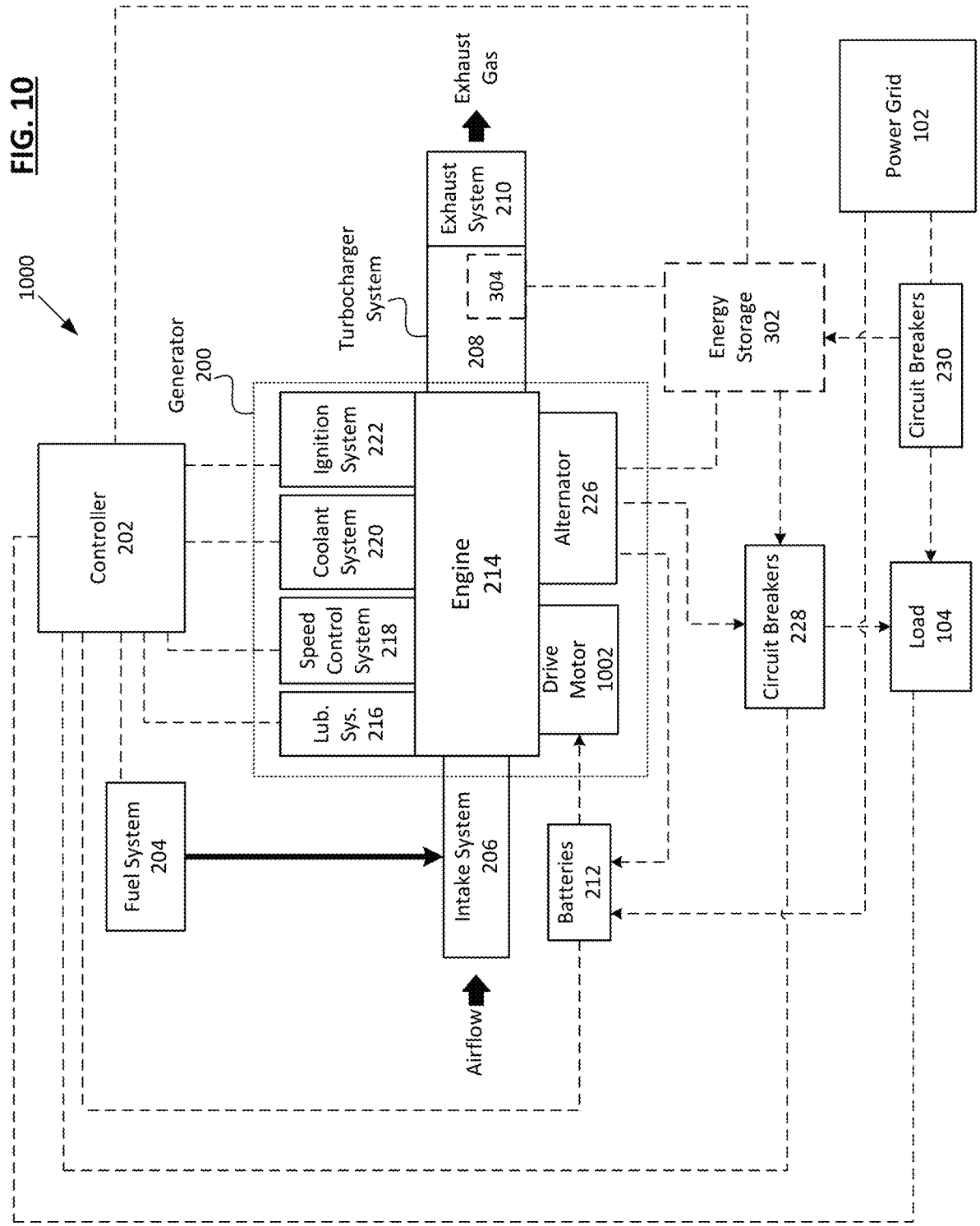
FIG. 10 is a schematic diagram of a genset as disclosed herein, which includes a drive motor.

FIG. 10 illustrates another example of a genset system 1000. The genset system 1000 includes similar components to the exemplary genset systems in FIGS. 2, 3, and 4. Furthermore, the genset system 1000 includes a drive motor 1002 that is operatively coupled to the batteries 212. In some examples, the drive motor 1002 is the same as the starter motor 224. For example, the starter motor 224/the drive motor 1002 is an electric motor, a pneumatic motor, a hydraulic motor, and/or an internal combustion engine. In operation, in response to the controller 202 providing a start signal to the batteries 212 to power the drive motor 1002, the batteries 212 provide power to the drive motor 1002. The drive motor 1002 ramps up the engine 214 to a cranking speed (e.g., 150 rpm). Then, instead of adding fuel from the fuel system 204 and/or airflow into the intake system 206 to initiate the fueling systems/ignition systems after reaching the cranking speed, the drive motor 1002 continues to ramp up the engine past the cranking speed and to the synchronous speed (e.g., 1500 rpm).

In some instances, the drive motor 1002 is a high torque industrial electrical motor. The high torque industrial electrical motor may be a 100 horsepower (HP) or greater motor. For instance, some starter motors may be smaller and/or less powerful since the starter motor only needs to ramp up the engine 214 to a cranking speed. A more powerful electrical motor, such as a high torque industrial electrical motor, may be used to ramp up the engine 214 past the cranking speed and to the synchronous speed. In some variations, the drive motor 1002 may be two or more motors. For example, the drive motor 1002 may include a starter motor that ramps the engine 214 up to the crank speed and a second motor (e.g., a high torque industrial electrical motor) that ramps the engine 214 up to the synchronous speed.

In some examples, the drive motor 1002 may ramp up the engine 214 by being input directly to the crankshaft via a direct 1:1 coupling (e.g., the front of the engine 214), may be input to the crankshaft via a belt drive (e.g., crankshaft pulley), may be input to the crankshaft via a gear or chain drive (e.g., the front gear train), may be input directly to the crankshaft via a flywheel (e.g., flywheel gear). As such, the final drive ratio involving pulleys and/or gears may be designed to coordinate with the engine/generator synchronization speed.

Like the previous systems, the genset system 1000 also includes one or more additional electrical connections (e.g., dotted lines) between the power grid 102 to the batteries 212 and/or between the alternator 226 to the batteries 212. The additional electrical connections assist with charging the batteries 212 used to start/activate the drive motor 1002. For example, the drive motor 1002 may use more power to ramp the engine 214 up to the synchronous speed. The additional electrical connections may assist in charging the batteries 212 up to a higher charge to assist with the increased power usage to ramp the engine 214 up to the synchronous speed.

FIG. 11 shows a method 1100 illustrating the steps in operating the genset system 1000. In other words, the controller 202 may use method 1100 to ramp the engine 214 past the cranking speed and to the synchronous speed using the drive motor 1002. In operation, at step 1102, the controller 202 determines an engine and/or generator start condition. For example, as mentioned previously, the power grid 102 may cease providing power to the load 104. The controller 202 may detect this situation and the method 1100 may move to step 1104. In some instances, the engine and/or generator start condition may be based on a user input. For instance, the controller 202 receives user input indicating to start the genset system 1000. Based on the user input, the controller 202 determines the start condition and the method 110 moves to step 1104.

At step 1104, the controller 202 determines whether the battery charge (e.g., charge of the batteries 212) exceeds a threshold. The threshold may be user-defined (e.g., the controller 202 receives user input indicating the threshold) or pre-determined. If the controller 202 determines the battery charge exceeds the threshold, the method 1100 moves to step 1110. Otherwise, the method 1100 moves to step 1106.

At step 1106, the controller 202 cancels the start request for the genset system 1000 (e.g., by not activating the drive motor 1002 to ramp up the engine speed). At step 1108, the controller 202 causes display of a prompt indicating a system status (e.g., the battery charge fails to exceed the threshold). In other words, if the charge of the batteries 212 fails to exceed the threshold, the controller 202 cancels the start request and displays a prompt to the user indicating that the genset system 1000 has failed to start due to the low battery charge.

If the charge of the batteries 212 exceeds the threshold, the method 1100 moves to step 1110. At step 1110, the controller 202 activates the drive motor 1002. For example, the controller 202 provides one or more signals to the batteries 212 to begin providing power to activate the drive motor 1002. The drive motor 1002 is used to rotate (e.g., crank) the engine 214 to a speed, such as the synchronous speed.

At step 1112, based on comparing the engine speed of the engine 214 with the synchronous speed, the controller 202 initiates a combustion process using one or more engine systems (e.g., engine fueling systems and/or ignition systems). For example, a sensor, such as an engine speed sensor, may provide feedback to the controller 202. The controller 202 monitors the feedback from the engine speed sensor to determine the engine speed (e.g., rotations per minute). The controller 202 compares the engine speed from the engine speed sensor with a threshold (e.g., a synchronous speed threshold). Based on the engine speed reaching the synchronous speed threshold, the controller 202 initiates engine systems such as the engine fueling systems and/or the ignition systems. For example, the drive motor 1002 continues ramping up the engine speed past the cranking speed and to the synchronous speed. After the controller 202 detects that the engine speed is at the synchronous speed, the controller 202 initiates the engine systems, which will cause combustion. For example, the controller 202 activates the fueling systems 204 to deliver fuel to the intake system 206 and/or control the intake system 206 to receive airflow. The engine 214 may use the fuel and airflow to begin the combustion process once the engine speed reaches the synchronous speed. Then, the method moves to step 1114.

In other words, instead of activating the engine speeds to cause combustion to rotate the engine 214 after the engine 214 reaches the cranking speed, the controller 202 initiates the engine systems to cause combustion in response to the engine 214 reaching the synchronous speed. The operational time between the engine 214 reaching the synchronous speed from the cranking speed may be reduced by using the drive 1002 to ramp up the engine 214 up to the synchronous speed.

In some examples, the controller 202 initiates the combustion process based on determining the engine speed of the engine 214 is less than the synchronous speed and greater than the cranking speed. For example, the controller 202 compares the engine speed from the engine 214 with an engine speed threshold. The engine speed threshold may be greater than the cranking speed (e.g., 200 RPM), but less than the synchronous speed (e.g., 1800 RPM). For instance, the engine speed threshold may be 1500 RPM. Based on the engine speed reaching the engine speed threshold, the controller 202 initiates the combustion process using the engine systems. In other words, the controller 202 initiates the combustion process after the cranking speed has been reached by the engine 214, but prior to reaching the synchronous speed. In some variations, the controller 202 may receive user input adjusting the engine speed threshold.

At step 1114, the controller 202 transitions the load management to the engine 214 and/or de-activates the drive motor 1002. For example, after the engine 214 reaches the synchronous speed and/or initiates the combustion process, the controller 202 de-activates the drive motor 1002 (e.g., by providing one or more signals to the batteries 212 to cease providing power to the drive motor 1002). Additionally, and/or alternatively, since the engine 214 is at the synchronous speed, the controller 202 transitions the load management to the engine 214 to cause the engine 214 to use the combustion process to provide power to the load 104.

In some variations, transitioning the load management to the engine 214 may be gradual. For example, prior to reaching the synchronous speed (e.g., after the engine speed reaches a threshold such as the engine speed threshold), the controller 202 initiates the combustion process using one or more engine systems (e.g., begin providing fuel to the engine 214 to produce power). The controller 202 continuously reduces (e.g., ramps down) the power provided by the drive motor 1002 and continuously increases (e.g., ramps up) the amount of fuel to the engine 214. After a predetermined period of time, the controller 202 may transition the engine 214 to use the combustion process for power and de-activate the drive motor 1002.

At step 1116, the controller 202 stabilizes the engine speed and load at the synchronous speed. For example, the controller 202 stabilizes and ensures that the output shaft of the engine 214 and the input shaft of the load 104 are at the synchronous speed and/or do not fluctuate significantly from the synchronous speed. In other words, after de-activating the drive motor 1002, the engine speed may fluctuate for a period of time at the synchronous speed. The controller 202 may stabilize the engine speed and load at the synchronous speed prior to supplying power to the load using the engine 214.

At step 1118, the controller 202 synchronizes and initiates power generation to the load 104 using the engine 214 (e.g., supplying power to the load 104). Additionally, and/or alternatively, after initiating power generation using the engine 214, the controller 202 may use the engine 214 (e.g., the alternator 226) to recharge the batteries 212. For example, the generator 200 and engine 214 may be running at different speeds. The controller 202 may use the engine speed sensor and/or one or more other sensors to synchronize the speeds of the generator 200 and the engine 214. After synchronizing the speeds, the controller 202 initiates power generation to the load 104 using the engine 214.

In some examples, the energy storage device 302 is optional. For example, the energy storage 302, which is described above, may replace the batteries 212. In other words, the controller 202 uses (e.g., provides one or more control signals to) the energy storage device 302 to provide power to the drive motor 1002 to ramp up the engine 214 to the synchronous speed.

In some instances, the controller 202 uses the energy storage 302, the batteries 212, the motor-generator 304, the turbocharger system 208, and/or the drive motor 1002 to ramp up the engine 214 to the synchronous speed. For example, the controller 202 uses the method 1100 (e.g., the drive motor 1002) to ramp up the engine 214 to the synchronous speed. Furthermore, the controller 202 uses methods 800 and/or 900 described above to accelerate the engine speed to reach the synchronous speed by using the energy storage device 302 to provide electrical power to the alternator 226 of the generator 200 to power the engine 214 as the engine 214 builds speed. Additionally, and/or alternatively, the controller 202 uses the energy storage device 302 to provide power to the motor-generator 304 of the turbocharger system 208 to activate the turbocharger.

In some variations and referring to the genset system 400, the controller 202 uses the flywheels 402/404, the batteries 212, the shaft 406 connecting the compressor 500 to the turbine 502, the turbocharger system 208, and/or the drive motor 1002 to ramp up the engine 214 to the synchronous speed. For example, the controller 202 uses the method 1100 (e.g., the drive motor 1002) to ramp up the engine 214 to the synchronous speed. Furthermore, the controller 202 uses methods 800 and/or 900 described above to accelerate the engine speed to reach the synchronous speed by using the flywheels 402/404 to power the engine 214 as the engine 214 builds speed.

FIG. 12 illustrates another example of a genset system 1200. The genset system 1200 includes similar components to the exemplary genset systems in FIGS. 2, 3, 4, and/or 10. Furthermore, the genset system 1200 includes a reserve genset 1202. The reserve genset 1202 may be a smaller genset and may be operatively coupled to the batteries 212. The reserve genset 1202 may also receive fuel from the fueling system 204 and use a combustion process to provide power to the batteries 212. The controller 202 then uses the batteries 212 to provide power to the drive motor 1002 to ramp up the speed of the engine 214 to the synchronous speed as described above.

FIG. 13 shows a method 1300 illustrating the steps in operating the genset system 1200. In other words, the controller 202 may use method 1300 to ramp the engine 214 past the cranking speed and to the synchronous speed using the drive motor 1002. Method 1300 has many similar steps to method 1100. However, if the controller 202 determines the battery charge fails to exceed the threshold at step 1304, the method 1300 moves to step 1306. At step 1306, the controller 202 activates the reserve genset 1202 and charges the batteries 212. In other words, the controller 202 provides one or more signals to initiate the combustion process for the reserve genset 1202 to recharge the batteries 212. Then, the method 1300 moves back to step 1304 and the controller 202 determines whether the charge of the batteries 212 exceeds the threshold.

In some examples, the reserve genset 1202 may be a manual start genset 1202. For example, the user may manually start the reserve genset 1202. In other examples, the controller 202 may provide a prompt on a display. The prompt may indicate for the user to manually start the reserve genset 1202 to recharge the batteries 212 based on the charge of the batteries 212 failing to exceed the threshold.

In some instances, the power grid 102, the circuit breakers 230, and/or the energy storage 302 are optional. When present, these components/systems may operate as described above to reduce the time required to ramp up the engine 214 to the synchronous speed. When one or more components are not present, the reserve genset 1202 may charge the batteries 212 such that there is enough charge for the drive motor 1002 to ramp the engine 214 up to the synchronous speed. For instances, the genset system 1200 may be in a remote location that might not be connected to the power grid. As such, after determining an engine and/or generator start request, the controller 202 may use the reserve genset 1202 to charge the batteries 212 to a sufficient charge to power the drive motor 1002 to ramp up the engine 214 to the synchronous speed.

The present subject matter may be embodied in other specific forms without departing from the scope of the present disclosure. The described embodiments are to be considered in all respects only as illustrative and not restrictive. Those skilled in the art will recognize that other implementations consistent with the disclosed embodiments are possible.

What is claimed is:

1. A method of reducing a startup time of a genset for providing requested power to a utility grid or a load, the genset including a generator, a turbocharger, and an energy storage device coupled to at least one of the generator and the turbocharger, wherein the generator comprises an engine, the method comprising:
   responding to a genset start signal by activating the energy storage device to supply power to the at least one of the generator and the turbocharger, thereby increasing a speed of the engine to reach a synchronous speed; and
   supplying, by the generator, power to the utility grid or load.

2. The method of claim 1, wherein:
   the generator further comprises an alternator;
   the turbocharger comprises a shaft and a motor-generator; and
   the energy storage device further comprises at least one of a battery and a supercapacitor configured to supply electrical power to at least one of the alternator and the motor-generator, wherein the at least one of the battery and the supercapacitor is pre-charged by the utility grid and maintained at a high-power state prior to being activated.

3. The method of claim 1, wherein the genset start signal is caused by a determination that the utility grid is not providing power to the load.

4. The method of claim 2, wherein responding to the genset start signal further comprises:
   disconnecting the utility grid from the load prior to activating the at least one of the battery and the supercapacitor; and
   supplying power to the load by the at least one of the battery and the supercapacitor after the utility grid is disconnected from the load.

5. The method of claim 2, further comprising:
   stabilizing, by the at least one of the battery and the supercapacitor, the speed of the engine by: absorbing excess power supplied by the at least one of the alternator and the motor-generator if the speed of the engine is too high or providing power to the at least one of the alternator and the motor-generator if the speed of the engine is too low.

6. The method of claim 2, further comprising:
   recharging, by at least one of the alternator, the motor-generator, and the utility grid, the at least one of the battery and the supercapacitor when the genset is operating at a desired power level.

7. The method of claim 2, further comprising:
   reducing, by the motor-generator, a turbocharger speed by absorbing power from the shaft;
   supplying, by the motor-generator, electrical power by converting the absorbed power into the electrical power; and
   absorbing, by the at least one of the battery and the supercapacitor, the electrical power supplied by the motor-generator.

8. The method of claim 1, wherein:
   the turbocharger comprises a shaft; and
   the energy storage device further comprises at least one flywheel configured to supply power to at least one of the engine and the shaft, wherein the at least one flywheel is maintained at a high-power state prior to being activated, the method further comprising:
   responding to the genset start signal by disconnecting the utility grid from the load prior to activating the at least one flywheel.

9. The method of claim 8, further comprising:
   reducing a rate at which the speed of the engine increases when the engine speed is within a predetermined threshold from the synchronous speed.

10. The method of claim 1, wherein the power is supplied by the energy storage device while the speed of the engine increases to approach the synchronous speed.

11. A genset comprising:
   a generator electrically coupled to a utility grid or a load and configured to supply power to the utility grid or the load, the generator comprising an engine and an alternator;
   a turbocharger fluidly coupled to the engine;
   an energy storage device coupled to at least one of the generator and the turbocharger; and
   a controller configured to:
      detect a condition wherein the utility grid is not providing power to the load; and
      respond to the condition by activating the energy storage device to supply power to the at least one of the generator and the turbocharger to increase a speed of the engine to reach a synchronous speed.

12. The genset of claim 11, wherein:
   the turbocharger comprises a shaft and a motor-generator;
   the energy storage device further comprises at least one of a battery and a supercapacitor configured to supply electrical power to at least one of the alternator and the motor-generator, wherein the energy storage device is pre-charged by the utility grid and maintained at a high-power state prior to being activated.

13. The genset of claim 12, wherein:
   the controller is further configured to respond to the condition by disconnecting the utility grid from the load prior to activating the energy storage device and activating the energy storage device to supply power to the load after the utility grid is disconnected from the load.

14. The genset of claim 12, wherein:
   the energy storage device is configured to stabilize the speed of the engine by absorbing excess power supplied by the at least one of the alternator and the motor-generator or providing power to the at least one of the alternator and the motor-generator; and at least one of the alternator, the motor-generator, and the utility grid is configured to recharge the energy storage device when the genset is operating at a desired power level.

15. The genset of claim 11, wherein:
the turbocharger comprises a shaft;
the energy storage device further comprises at least one flywheel configured to supply power to at least one of the engine and the shaft, wherein the energy storage device is maintained at a high-power state prior to being activated.

16. The genset of claim 15, wherein:
the controller is configured to reduce a rate at which the speed of the engine increases when the speed of the engine is within a predetermined threshold from the synchronous speed by feeding the power back into the at least one flywheel.

17. The genset of claim 11, wherein:
the energy storage device further comprises at least one of a battery and a supercapacitor, the at least one of the battery and the supercapacitor configured to supply electrical power to at least one of the utility grid, the load, the alternator, and the turbocharger.

18. The genset of claim 15, wherein the controller is further configured to respond to the condition by disconnecting the utility grid from the load prior to activating the energy storage device.

19. The method of claim 1, wherein the genset further includes a drive motor, and wherein the method further comprises:
responding to the genset start signal by providing one or more signals to the drive motor to ramp up the speed of the engine past a cranking speed and to the synchronous speed.

20. The method of claim 19, further comprising:
based on comparing the speed of the engine with the synchronous speed, initiating a combustion process of the engine to occur using one or more engine systems; and
wherein the supplying the power to the utility grid or load is based on the initiating the one or more engine systems.

21. The method of claim 20, wherein the initiating the combustion process based on comparing the speed of the engine with the synchronous speed comprises initiating the combustion process based on determining the speed of the engine is less than the synchronous speed by a pre-determined threshold and greater than the cranking speed.

22. The method of claim 20, wherein the initiating the combustion process based on comparing the speed of the engine with the synchronous speed comprises initiating the combustion process based on determining the speed of the engine reaches the synchronous speed.

23. The method of claim 20, further comprising:
based on the speed of the engine reaching the synchronous speed and initiating the combustion process, providing one or more signals to de-activate the drive motor.

24. The method of claim 19, wherein the drive motor is a high torque industrial electrical motor.

25. The method of claim 1, wherein the turbocharger comprises a shaft operatively coupled to a compressor, the compressor configured to facilitate delivery of air from an atmosphere surrounding the generator into the engine.

26. The method of claim 25, the genset further comprising a second compressor connected in series with or in parallel to the turbocharger and an electric motor coupled to the second compressor.

27. The genset of claim 11, wherein the turbocharger comprises a shaft operatively coupled to a compressor, the compressor configured to facilitate delivery of air from an atmosphere surrounding the generator into the engine.

28. The genset of claim 27, further comprising a second compressor connected in series with or in parallel to the turbocharger and an electrical motor coupled to the second compressor.

* * * * *